United States Patent [19]

Olson et al.

[11] 4,170,151
[45] Oct. 9, 1979

[54] OPERATING UNIT FOR CONTROLS

[75] Inventors: Daniel H. Olson, Louisville; Larry R. Hunsicker, Canton, both of Ohio; Stanley A. Johnson, Brookfield, Wis.

[73] Assignee: Merit Plastics, Inc., East Canton, Ohio

[21] Appl. No.: 842,212

[22] Filed: Oct. 14, 1977

[51] Int. Cl.² .............................................. G01P 3/20
[52] U.S. Cl. ............................... 74/501 R; 74/501 P; 74/527; 74/535; 403/388
[58] Field of Search ........................ 85/1 K; 248/219.3; 74/501 R, 527, 513, 503, 501 P, 502, 489, 535

[56] References Cited

U.S. PATENT DOCUMENTS

| 1,356,293 | 10/1920 | Klinger | 74/503 |
| 1,697,317 | 1/1929 | Kyle | 85/1 K |
| 2,903,223 | 9/1959 | DeGray | 248/219.3 |
| 3,000,231 | 9/1961 | Cochran | 74/502 |
| 3,104,559 | 9/1963 | Dotter | 74/502 |
| 3,868,865 | 3/1975 | Neyer | 74/501 R |
| 3,981,207 | 9/1976 | Stant et al. | 74/513 |

Primary Examiner—Benjamin W. Wyche
Assistant Examiner—David C. Reichard
Attorney, Agent, or Firm—Harness, Dickey & Pierce

[57] ABSTRACT

A unit for remotely operating an element to different positions such as start, fast, slow and stop for a driving application such as the one herein illustrated for the engine of a lawn mower. The unit is made of plastic material being molded in two parts with a recess in the side of one part which is adapted to receive a tube forming a handle. A bolt passes through a hole in the part and through the tube to which it is securely retained when a lock nut and bolt is tightened. The unit has a slot between the two parts in which a lever is movable to advance and retract one or more control wires which operate the carburetor, brake or other element of the lawn mower.

5 Claims, 8 Drawing Figures

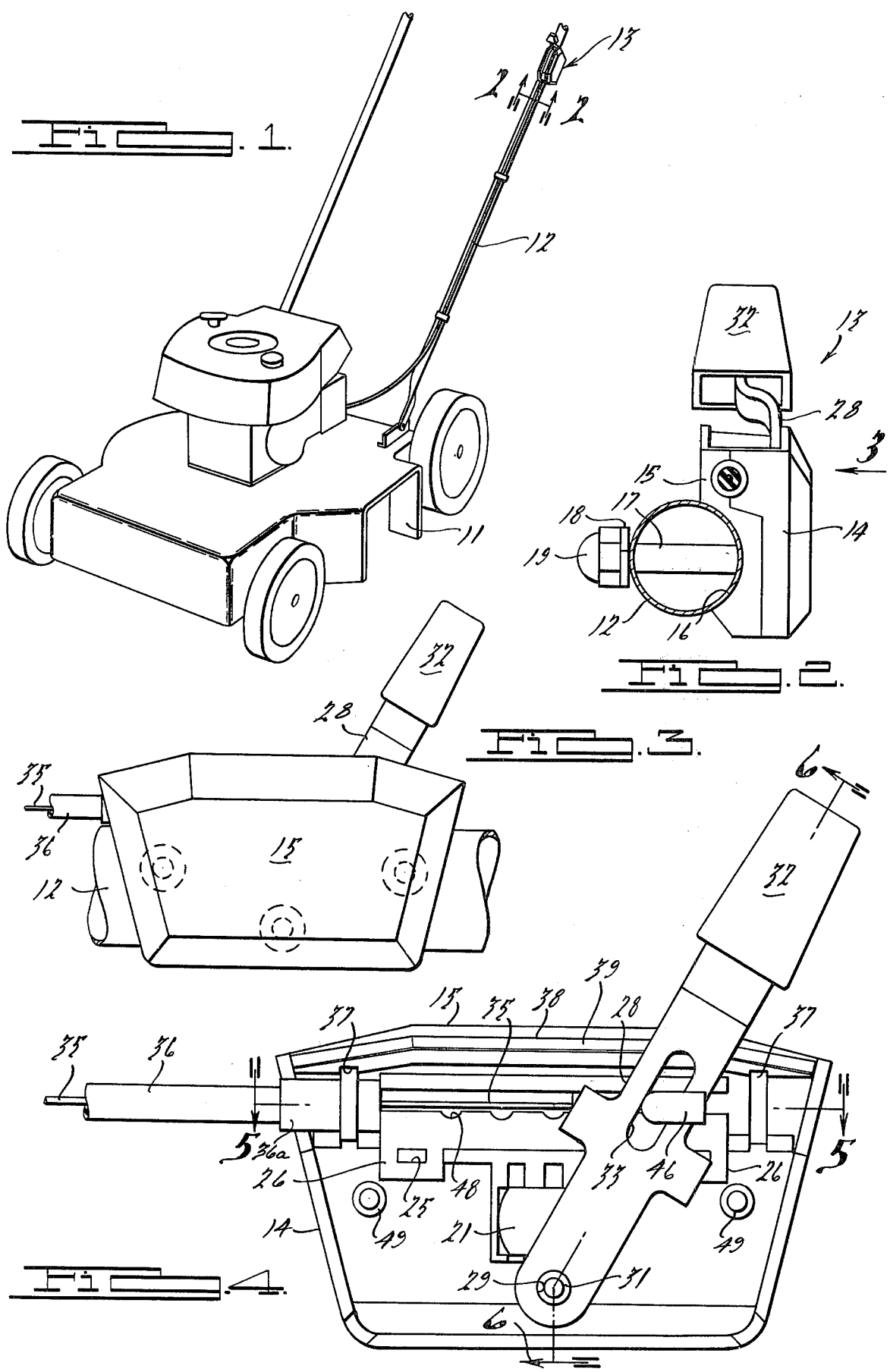

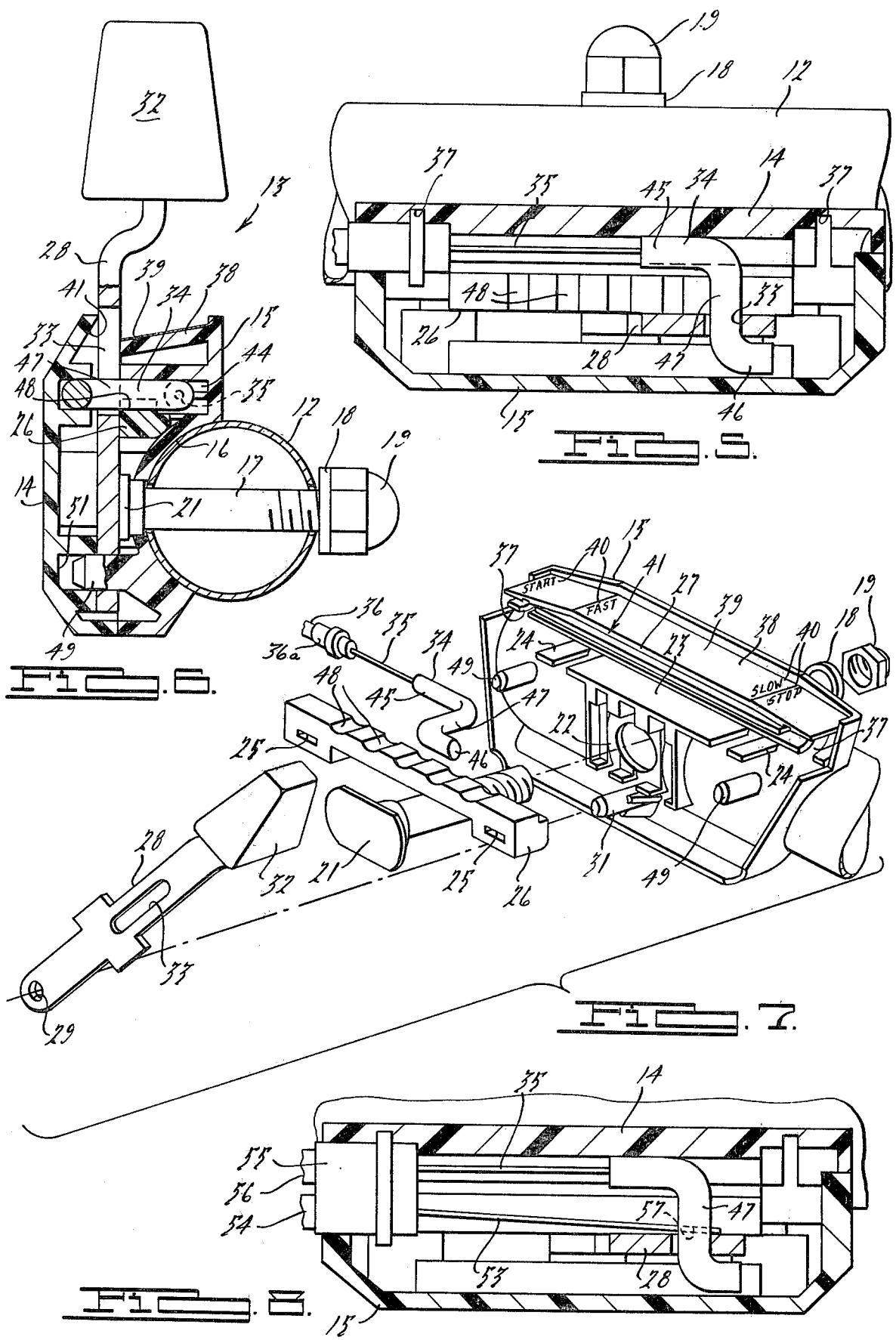

OPERATING UNIT FOR CONTROLS

BACKGROUND OF THE INVENTION

From a search which was conducted, the following patents were uncovered which provide a disclosure for different levers and operating units:

| Gwin, Jr. | 2,862,401 | December 2, 1958 |
| Hermanson et al | 3,479,903 | November 25, 1969 |
| Conrad | 3,516,299 | June 23, 1970 |
| Stahr | 3,516,301 | June 23, 1970 |
| Conrad | 3,570,324 | March 16, 1971 |
| Ripple | 3,618,687 | November 9, 1971 |

While the above patents disclose various types of units, none of them disclose an operating unit like the one presented herewith. In none of these disclosures of the patents is a device shown which encompasses a tube and is secured thereto by a single bolt for retaining the parts of the unit in firm fixed relation to its support. Other advantages embodied in the remote operating unit comprised in the present invention are not disclosed in the uncovered prior art.

SUMMARY OF THE INVENTION

The invention pertains to a unit for operating an element to different positions from a remote point where the unit is secured. The unit is made of plastic material being cast in two parts which form the unit when secured together by projecting pins and recesses. The one part has an outer semi-cylindrical recess and an aperture for a bolt, the head of which is captured within a recess on the inner side of the part. The bolt passes through an aperture in a tube which rests within the tubular recess and is secured thereto by a lockwasher and nut which mounts the unit remotely from the element to be controlled. Two bosses extend outwardly from the part on the inside thereof which are aligned with two apertures in the outer part which receive the bosses and are secured thereto by adhesive material. A slot is provided at the top between the two parts of the assembly through which a lever extends which is pivoted on a central boss. The lever has a slot in which a Z-shaped rod is moved backward and forward along with a wire secured in one end thereof. The wire operates a remote element such as a carburetor of a lawn mower so that a flange at the top of one part forming one side of the slot has a decal thereon which has words such as start, fast, slow and stop indicating different positions thereon. The lever may operate two wires if two different control elements are to be actuated at the same time.

BRIEF DESCRIPTION OF THE DRAWING

FIG. 1 is a perspective view with the end of the U-shaped steering element broken away having a control unit thereon embodying features of the present invention;

FIG. 2 is an enlarged sectional view of the structure illustrated in FIG. 1, taken on the line 2—2 thereof;

FIG. 3 is a side view of the unit illustrated in FIG. 2, as viewed from the point 3 thereof;

FIG. 4 is an enlarged view of the structure illustrated in FIG. 3, with the outer part removed therefrom;

FIG. 5 is a sectional view of the structure illustrated in FIG. 4, taken on the line 5—5 thereof;

FIG. 6 is a sectional view of the structure illustrated in FIG. 4, taken on the line 6—6 thereof;

FIG. 7 is an exploded view of the structure illustrated in FIG. 4, and

FIG. 8 is a view of structure, similar to that illustrated in FIG. 5, showing a plurality of wires actuated by the control unit.

DESCRIPTION OF THE PREFERRED EMBODIMENT

A lawn mower 11, as illustrated in FIG. 1, has a tubular guiding element 12 on which a unit 13 of the present invention is secured being cast from a plastic material in two parts 14 and 15. The main part 15 has a cylindrical recess 16 on one side which receives a portion of the tubular element 12 to be secured in fixed relation thereto by a bolt 17 having a lock washer 18 and cap nut 19 thereon, as illustrated in FIG. 6. The bolt has a head 21 which is retained within a recess 22 within the part 15 against turning. The material forming the recess extends from a flange 23 which has projections 24 spaced at the ends thereof. The projections extend into apertures 25 to locate and secure a third plastic element 26 along one side of a slot 27 between the parts 14 and 15 in which an actuating lever 28 is movable. The lever has an aperture 29 at the inner or bottom end which extends over a bottom central boss 31 which is part of the main casting 15. This permits the aperture 29 to pivot on the boss 31 when the opposite end having the knob 32 is moved along the slot 27.

The lever 28 has a slot 33 through its body in which an actuatable Z-shaped element 34 operates to advance a control wire 35 forwardly or rearwardly through a tubular element 36. The tubular element 36 may extend from either end of the main plastic part 15 and has a securable element 36a retained by a notch 37 at either end thereof. A flange 38 extends across the top of the part 15 and has a decal 39 thereon containing the words start, fast, slow and stop indicated by the numeral 40. These conform to the settings for the lever on the carburetor of the lawn mower and other wording can be employed for other applications of the unit. When the part 14 is secured to the part 15, the slot 27 is formed therebetween in which the actuating lever 28 is movable. A separate plastic element 26 has the apertures 25 in each end which slide over the projections 24 to be located adjacent to the flange 23 to form a slot 44 for the actuatable element 34. One end 45 of the actuating element has the wire 35 extending therein and fixed thereto with the opposite end 46 which is offset from the central portion 47 retaining the actuating element in the slot 33 of the lever 28. The element 26 has a plurality of notches 48 at the top in which the central portion 47 of the actuating element engages to provide stops for locating the position of the end of the wire 35 when actuated by the lever 28. Additional bosses 49 are provided at each end of the part 15 which, along with the boss 31, extend into three apertures 51 in the plastic part 14 which covers the open side of the plastic part 15. Adhesive material is employed between the bosses 49 and the wall of the engaged apertures 51 to permanently maintain the two plastic parts in fixed relation to each other. In such a relationship, the grasping of the knob 32 permits one to advance or retract the lever 28 to axially move the wire 35 in either direction for moving the control of the lawn mower for start, fast and slow operations or stop, with the actuating element 34 retained in any one of the positions by one of the notches 48.

In FIG. 8, the same mechanism is illustrated except for a second wire 53 extending through a second tubular element 54 which is retained in a securable element 55 which has another tubular element 56 attached thereto. The wire 53 extends through an aperture 57 in the central portion 47 of the actuating element 34 to which it is welded or otherwise secured. When operating the lever 28, both of the wires 35 and 53 are advanced or retracted simultaneously. Otherwise, both of the plastic parts 14 and 15 are substantially the same except for the opening for the larger element 55.

What is claimed:

1. In a remote actuating unit for controlling a controllable element to different positions from a remote point by means of a control wire, said controllable element having a tubular element associated therewith adapted for supporting said actuating unit, the combination comprising: a first part having an outwardly facing arcuate recess in a side thereof adapted to receive a portion of said tubular element, an aperture in said recess for receiving a bolt therethrough and an inner recess adapted to receive the head of said bolt; a second part having edge portions adapted to engage said first part, said first and second parts in combination defining a hollow interor, at least one of said first and second parts having a slot in a top wall thereof; a boss formed integrally with one of said first and second parts; a lever pivotally attached to said boss and extending through said slot, said lever having an aperture therein; a Z-shaped element having one leg retained in said aperture and another leg adapted to be attached to said control wire; and an elongated element fixidly attached to at least one of said first and second parts and located within said hollow interior, said elongated element having a plurality of notches therein adapted to adjustably locate a middle portion of said Z-shaped element.

2. In a remote actuating unit as recited in claim 1, wherein said first and second parts have facing notches therein for retaining a securable element, said securable element being adapted to be attached to a tubular element in which said control wire is slidably carried.

3. In a remote actuating unit as recited in claim 2, wherein said first and second parts and said elongated element are made of plastic.

4. In a remote actuating unit as recited in claim 3, wherein one of said first and second parts has a plurality of inwardly directed projections which supportably project into corresponding apertures in said elongated element.

5. In a remote actuating unit as recited in claim 4, wherein said Z-shaped element is slidably located in an elongated slot axially aligned with said control wire.

* * * * *